UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRUNING, OF HÖCHST-ON-THE-MAIN, GERMANY, A CORPORATION OF GERMANY.

MEDICINAL PREPARATION.

1,081,897.     Specification of Letters Patent.     Patented Dec. 16, 1913.

No Drawing. Application filed August 6, 1912, Serial No. 713,508. Renewed August 13, 1913. Serial No. 784,612.

*To all whom it may concern:*

Be it known that we, PAUL EHRLICH, M. D., professor of medicine, and ALFRED BERTHEIM, Ph. D., citizens of the Empire of Germany, and residing at Frankfort-on-the-Main, Germany, have invented a certain new Medicinal Preparation, of which the following is a specification.

This invention relates to preparations of products made as described in Letters Patent of the United States No. 986,148, dated March 7, 1911, which products may be generically designated as arseno benzenes and contain the generic nucleus:

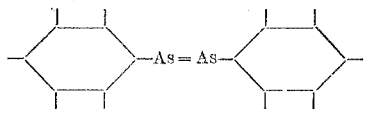

The amino-oxy-arsenobenzenes, and particularly the 3-3′-diamino-4-4′-dioxyarsenobenzene, have been found to be valuable products for therapeutical purposes and especially for the treatment of syphilis and other infectious diseases. The free bases, however, are insoluble or difficultly soluble in water but they can be dissolved in alkalies to form salts, and they can also be dissolved in dilute acids such as hydrocloric acid. The hydrochlorids or dihydrochlorids are readily soluble in water, and accordingly are a more advantageous form for use than the free bases.

The present invention relates to alkaline solutions or neutral suspensions made from such hydrochlorids, and specifically to the alkaline solutions and suspensions made from the dihydrochlorids of the 3-3′-diamino-4-4′-dioxarsenobenzene, these solutions or suspensions being suitable and advantageous for hypodermic injections.

The invention will be further described in connection with the dihydrochlorid of the 3-3′-diamino-4-4′-dioxyarsenobenzene, hereinafter referred to as the dihydrochlorid.

The following procedure gives a solution suitable for intravenous injection. 1.5 grams of chemically pure sodium hydroxid are dissolved in 8.5 c. c. distilled water. For 0.5 gram of the dihydrochlorid 1.09 grams equal to about 0.95 c. c. equal to about 19–20 drops of this solution are used. Into a narrow-necked graduated glass stoppered sterile cylinder-measure of 300 c. c. capacity, containing about 50 sterile glass beads 30 to 40 c. c. sterile distilled water is measured. Then the dihydrochlorid *e. g.*, 0.5 gram is added, and shaken until it goes entirely into solution and the solution does not show, even when examined by transmitted light, any gelatinous drop-like particles. After solution is completed, and the solution is clear and free from undissolved particles, 19 drops of the 15% caustic soda solution already described are added all at once. The precipitate at first formed, dissolves on shaking and there results a clear yellow solution. This solution is diluted to 250 c. c. with sterile 0.5% saline solution which has been prepared from chemically pure sodium chlorid and sterile distilled water, freshly prepared. In case the solution is not quite clear, or becomes slightly turbid after a few minutes, a few more drops of caustic soda solution should be added, a drop at a time and waiting 2 or 3 minutes after each drop to see if this quantity suffices to clear the solution. The resulting clear solution is ready for use. This solution contains 0.5 gram of the dihydrochlorid in 250 c. c. For less amounts of the dihydrochlorid, the corresponding amounts of the solution can be used. Instead of using the graduated glass cylinder, the concentrated solution of the dihydrochlorid can be prepared in a small glass-stoppered flask with the aid of glass beads, and after the subsequent addition of caustic soda solution and complete clarification, poured into the saline solution. A solution for intramuscular injection can also be made with the alkaline solution already described, but in this case a much smaller amount of fluid (only about 5 c. c.) is required. For its preparation, for example, 0.5 gram of the dihydrochlorid are well triturated in a sterile mortar with 19 drops of the 15% caustic soda solution, and then diluted with distilled water to the desired volume.

For subcutaneous injection it is sometimes advantageous to use neutral suspensions made from the dihydrochlorid. For this purpose the dihydrochlorid powder, *e. g.* 0.5 gram, is introduced into a sterile porcelain dish, and triturated carefully with 8 drops (0.5 gram=0.380 c. c.) caustic soda solution. To it is added, at first drop by drop, with constant trituration, the requisite quantity (about 5 to 10 c. c.) sterile water. The fine suspension produced is tested with litmus paper exactissime for neutral reaction, a drop of caustic soda solution or of dilute hydrochloric acid being added if necessary.

The solution of caustic soda previously described can be used in making the various alkaline solutions as well as the neutral suspension according to the present invention.

What we claim and desire to secure by Letters Patent of the United States is:—

1. The process of producing a preparation of amino-oxy-arsenobenzenes which comprises treating such products in the form of their hydrochlorids with a solution of a caustic alkali.

2. The process of producing a preparation of amino-oxy-arsenobenzenes which comprises treating such products in the form of their hydrochlorids with a solution of caustic soda.

3. The process of producing a preparation of diamino-dioxy-arsenobenzenes which comprises treating such products in the form of their dihydrochlorids with a solution of caustic alkali.

4. The process of producing a preparation of diamino-dioxy-arsenobenzenes which comprises treating such products in the form of their dihydrochlorids with a solution of caustic soda.

5. The process of producing a preparation of diamino-dioxy-arsenobenzenes which comprises treating such products in the form of their dihydrochlorids with a 15% solution of caustic soda.

6. The process of producing a preparation of 3-3'-diamino-4-4'-dioxyarsenobenzene which comprises treating the same in the form of its dihydrochlorid with a 15% solution of caustic soda.

7. An alkaline injection preparation comprising an aminooxyarsenobenezene and caustic alkali.

8. An alkaline injection preparation comprising a polyamino-dioxyarsenobenzene and caustic alkali.

9. An alkaline injection preparation comprising a diaminodioxyarsenobenzene and caustic alkali.

10. An alkaline injection preparation comprising a solution of hydrochlorid of an amidooxyarsenobenzene in a caustic alkali.

11. An alkaline injection preparation comprising a solution of hydrochlorid of a polyamino-dioxy-arseno-benzene in a caustic alkali.

12. An alkaline injection preparation comprising a solution of a hydrochlorid of a diamino-dioxyarsenobenzene in a caustic alkali.

13. An alkaline injection preparation comprising a solution of a dihydrochlorid of an aminooxyarsenobenzene in caustic soda.

14. An alkaline injection preparation comprising a solution of a dihydrochlorid of a polyamino-dioxy-arsenobenzene and caustic alkali.

15. An alkaline injection preparation comprising a solution of a dihydrochlorid of a diamino-dioxy-arsenobenzene in caustic soda.

16. An alkaline injection preparation comprising the dihydrochlorid of 3-3'-diamino-4-4',-dioxy-arsenobenzene dissolved in a caustic soda solution.

17. An alkaline injection preparation comprising the dihydrochlorid of 3-3'-diamino-4-4'-dioxy-arsenobenzene dissolved in a 15% caustic soda solution.

In testimony whereof we have hereunto signed our names in the presence of two subscribing witnesses.

PAUL EHRLICH.
ALFRED BERTHEIM.

Witnesses:
  CARL GRUND.
  ELSE MEBUS.